United States Patent
Kim

[11] Patent Number: 5,915,045
[45] Date of Patent: Jun. 22, 1999

[54] METHOD AND APPARATUS FOR ENCODING A CONTOUR OF AN OBJECT BY ADAPTING A VERTEX CODING TECHNIQUE

[75] Inventor: Jin-Hun Kim, Seoul, Rep. of Korea

[73] Assignee: Daewoo Electronics Co., Ltd., Seoul, Rep. of Korea

[21] Appl. No.: 08/862,247

[22] Filed: May 23, 1997

[30] Foreign Application Priority Data

Jan. 15, 1997 [KR] Rep. of Korea .......................... 97-974

[51] Int. Cl.[6] ....................................................... G06K 9/36
[52] U.S. Cl. ........................................................... 382/242
[58] Field of Search .................................. 382/232–234, 382/236, 238, 239, 241, 242; 348/384, 394, 395, 400–404, 407–416, 420–421, 425, 430–431

[56] References Cited

U.S. PATENT DOCUMENTS

| | | | |
|---|---|---|---|
| 5,592,228 | 1/1997 | Dachiku et al. | 348/416 |
| 5,635,986 | 6/1997 | Kim | 348/416 |
| 5,691,769 | 11/1997 | Kim | 348/403 |
| 5,710,838 | 1/1998 | Jung | 382/242 |
| 5,737,449 | 4/1998 | Lee | 382/242 |
| 5,757,971 | 5/1998 | Kim | 382/241 |
| 5,764,808 | 6/1998 | O'Connell et al. | 382/242 |
| 5,774,595 | 6/1998 | Kim | 382/241 |
| 5,774,596 | 6/1998 | Kim | 382/242 |

Primary Examiner—Jose L. Couso
Attorney, Agent, or Firm—Pennie & Edmonds LLP

[57] ABSTRACT

A method for encoding a video signal of a contour of an object based on the iterated refinement technique determines a plurality of vertices on the contour; and calculates a contour pixel bit-number required to encode all the contour pixels and a vertex bit-number needed to encode all the vertices. After generating a determination signal representing the smaller of the contour pixel bit-number and the vertex bit-number, the method encodes contour information representing the vertices or the contour pixels based on the determination signal to generate a coded data.

14 Claims, 5 Drawing Sheets

METHOD AND APPARATUS FOR ENCODING A CONTOUR OF AN OBJECT BY ADAPTING A VERTEX CODING TECHNIQUE

FIELD OF THE INVENTION

The present invention relates to a method and apparatus for encoding a contour of an object expressed in a video signal; and, more particularly, to a method and apparatus capable of encoding the contour through the use of an adaptive coding scheme employing an octant based vertex coding technique and a chain coding technique.

DESCRIPTION OF THE PRIOR ART

In digitally televised systems such as video-telephone, teleconference and high definition television systems, a large amount of digital data is needed to define each video frame signal since a video line signal of the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

In processing a contour of an object expressed in a video signal, contour information representing positions of contour pixels constituting the contour is important for the analysis and synthesis of the shape of the object. A classical coding method used to represent the contour information is a chain coding technique. The chain coding technique, however, requires a substantial amount of bits for representing the contour information, although the technique does ont incur any loss in the contour information.

To overcome the drawback of the chain coding technique, therefore, there have been proposed several methods to encode the contour information such as polygonal approximation, B-spline approximation and DST (Discrete Sine Transform) combined with a polygonal approximation technique. In such approximation techniques, the contour is approximated by line or curve segments, each of the segments connecting a pair of adjacent vertices on the contour, and the vertices are encoded based on, e.g., the so-called locally-adaptive octant-based vertex coding technique (see, e.g., International Organisation for Standardisation, Coding of Moving Pictures and Audio Information, ISO/IEC JTCI/SC29/WG11, Shape Coding AHG, Jul. 30, 1996, entitled "Revised Description of S4a: Geometrical Representation Method" by K. O'Connell, P. Gerken and J. H. Kim).

Referring to FIG. 1, there is shown a schematic block diagram of a conventional apparatus for encoding vertices of a contour of an object in a video signal by employing the octant-based vertex coding technique.

A binary mask is inputted to a contour extraction block 10, wherein each of the pixels in the binary mask is represented by one of the binary values, i.e., 0 or 1, depending on whether a pixel resides in either an object or a background region.

The contour extraction block 10 extracts a contour of the object from the binary mask and provides an image of the contour to a vertex selection block 20. The contour is made of contour pixels, each contour pixel being an object pixel positioned on the boundary of the object.

The vertex selection block 20 selects a plurality of vertices by using a conventional iterated refinement technique, e.g., a polygonal approximation technique, wherein a pair of contour pixels separated by a maximum distance is determined first as starting vertices and additional contour pixels are selected, one by one, as another vertex until a largest perpendicular distance $d_{max}$ from a line segment joining a pair of adjacent vertices to a contour segment defined by the pair of adjacent vertices does not exceed a preset threshold $D_{max}$. The vertices are encoded at a vertex coding block 30.

In such a conventional apparatus for encoding vertices, since a larger predetermined threshold $D_{max}$ results in a rough representation of the contour with a smaller number of vertices, it is preferable that the threshold $D_{max}$ be as small as possible for a meaningful approximation. However, if the threshold becomes too small, e.g., if $D_{max}$ is smaller than or equal to one-half of the pixel-to-pixel distance, the number of vertices determined by the iterated refinement technique rapidly increases to the extent that it may be rather preferable to encode the contour by using the conventional chain coding technique.

Nevertheless, all contours are not effectively encoded by the conventional encoding apparatus. For example, a contour including a plurality of lines, e.g., a polygon shown in FIG. 2A, may preferably be coded by the iterated refinement technique rather than the chain coding technique regardless of the magnitude of the threshold $D_{max}$, while a highly fluctuated contour as shown in FIG. 2B may preferably be coded by the chain coding technique rather than the iterated refinement technique because the number of vertices rapidly increases.

Therefore, even though the aforementioned iterated refinement technique is capable of reducing the volume of transmission data, search has continued to find a better approach to further reduce the volume of transmission data.

SUMMARY OF THE INVENTION

It is, therefore, a primary object of the invention to provide an improved contour encoding method and apparatus which can be beneficially used to further reduce the amount of transmission data by using an adaptive coding scheme employing an octant based vertex coding technique and a chain coding technique.

In accordance with the invention, there is provided a method for encoding a video signal of a contour of an object based on an iterated refinement technique, wherein a plurality of vertices are determined on the contour having contour pixels therein and each contour segment defined by two adjacent vertices on the contour is approximated by a line segment joining said two adjacent vertices, the method comprising the steps of:

(a) calculating a contour pixel bit-number, wherein the contour pixel bit-number represents the number of bits necessary to encode all the contour pixels;

(b) estimating a vertex bit-number, wherein the vertex bit-number represents the number of bits necessary to encode all the vertices on the contour;

(c) comparing the contour pixel bit-number with the vertex bit-number to generate a determination signal representing the smaller of the two bit-numbers; and (d) encoding contour information based on the determination signal to generate coded data, wherein the contour information represents either the vertices or the contour pixels.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
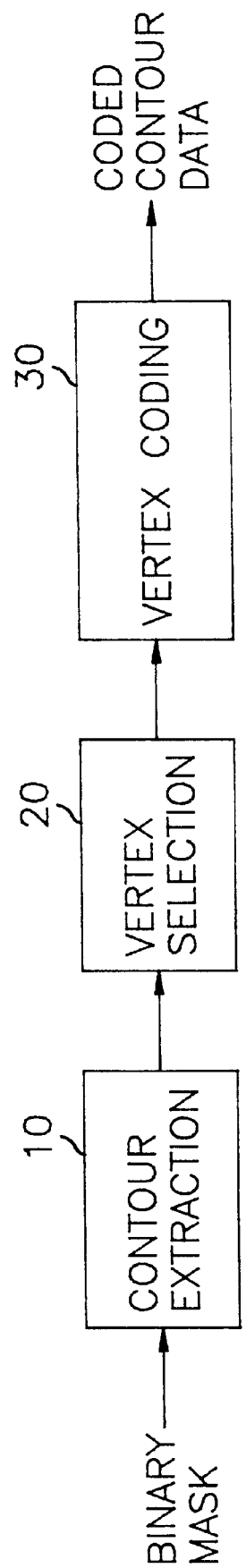
FIG. 1 shows a schematic block diagram of a conventional apparatus for encoding vertices of a contour of an object in a video signal.
Figure 2A:
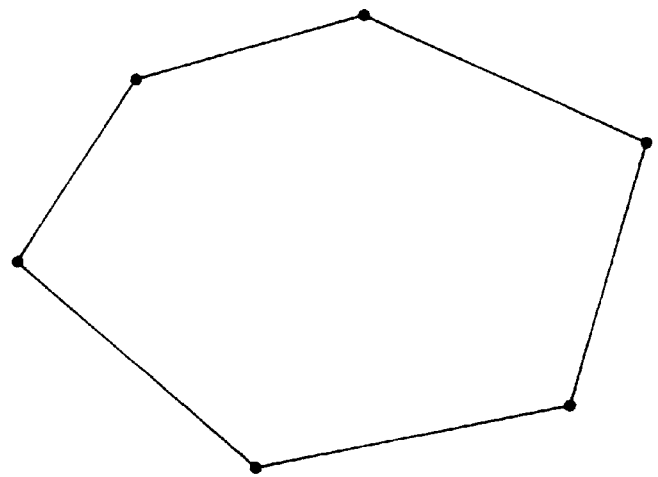
FIGS. 2A and 2B present a polygon and a highly fluctated contour, respectively, to illustrate a drawback of the conventional iterated refinement technique.
Figure 2B:
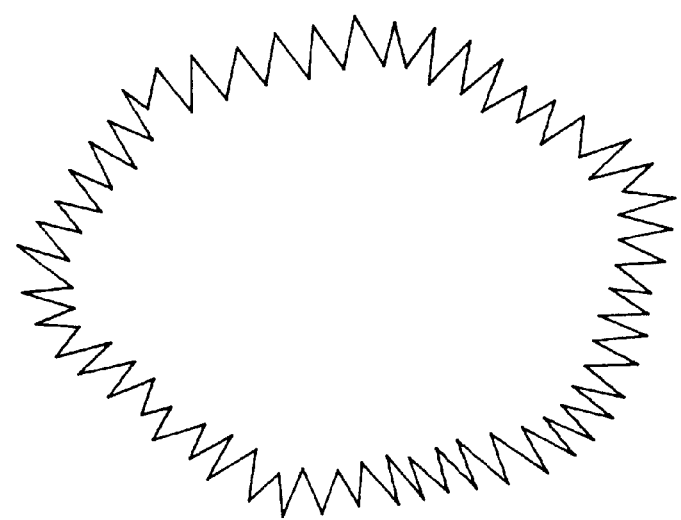
Figure 3:
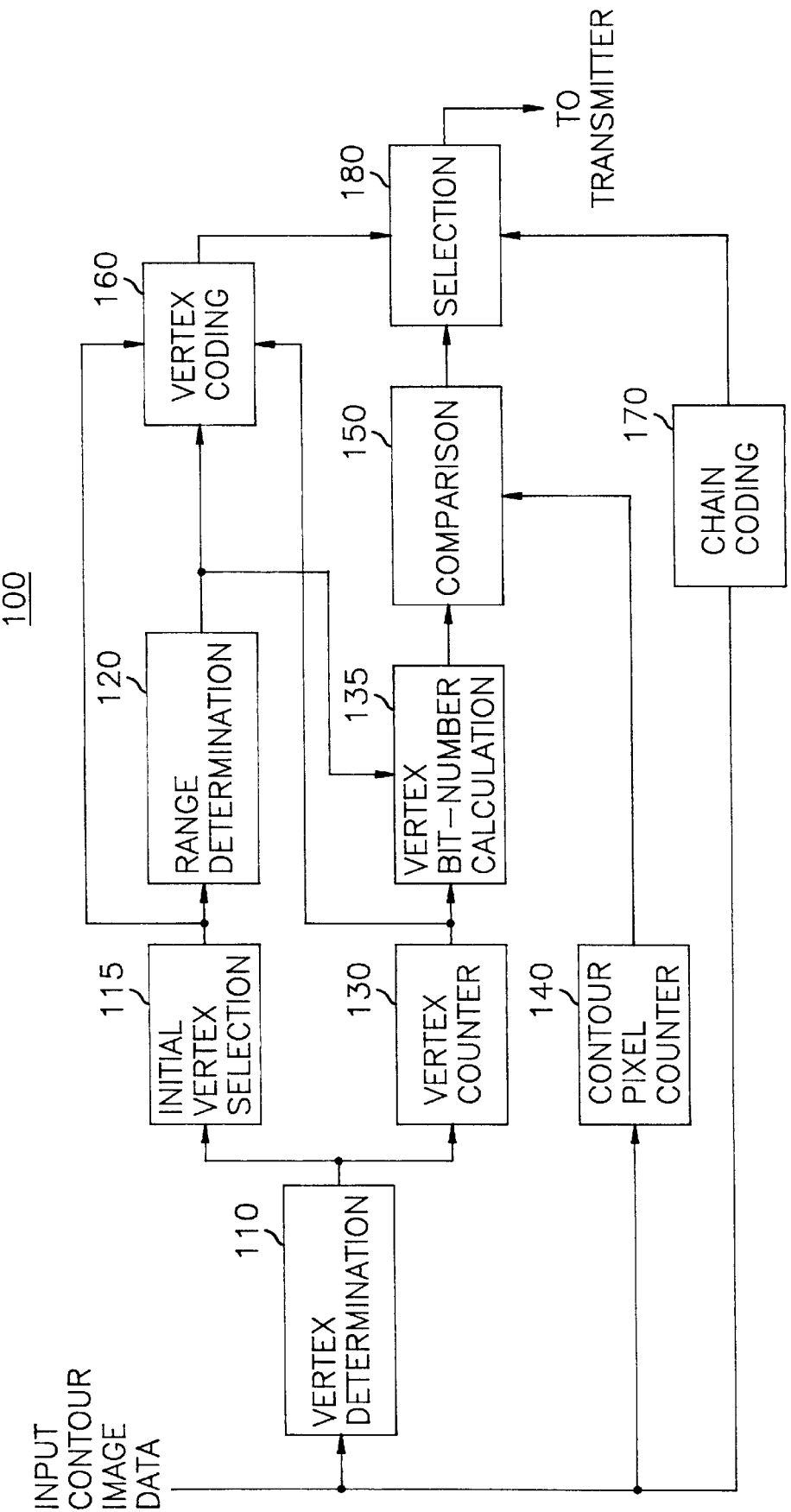
FIG. 3 represents a block diagram of an apparatus for encoding input contour image data in accordance with the present invention.

Referring to FIG. 3, there is shown a block diagram of an apparatus 100 for encoding input contour image data in accordance with the present invention, wherein the input contour image data represents positions of contour pixels constituting a contour of an object. The input contour image data is fed to a vertex determination block 110, a contour pixel counter 140 and a chain coding block 170. The chain coding block 170 encodes a plurality of contour pixels by using the conventional chain coding technique to provide the chain coded data to a selection block 180, wherein the conventional chain coding technique encodes displacements between closest adjacent contour pixels by means of a octant-based vertex coding technique based on the input contour image data.

In the meantime, the vertex determination block 110 determines a plurality of vertices on the contour by using the conventional iterated refinement technique. The vertices are arranged in a processing order on the contour, and information on the arranged vertices is provided one after another to an initial vertex selection block 115 and a vertex counter 130.

The vertex counter 130 counts the number of the vertices sequentially provided from the vertex determination block 110 to provide the vertex number N to a vertex bit-number calculation block 135 and a vertex coding block 160, N being a positive integer.

Figure 4:
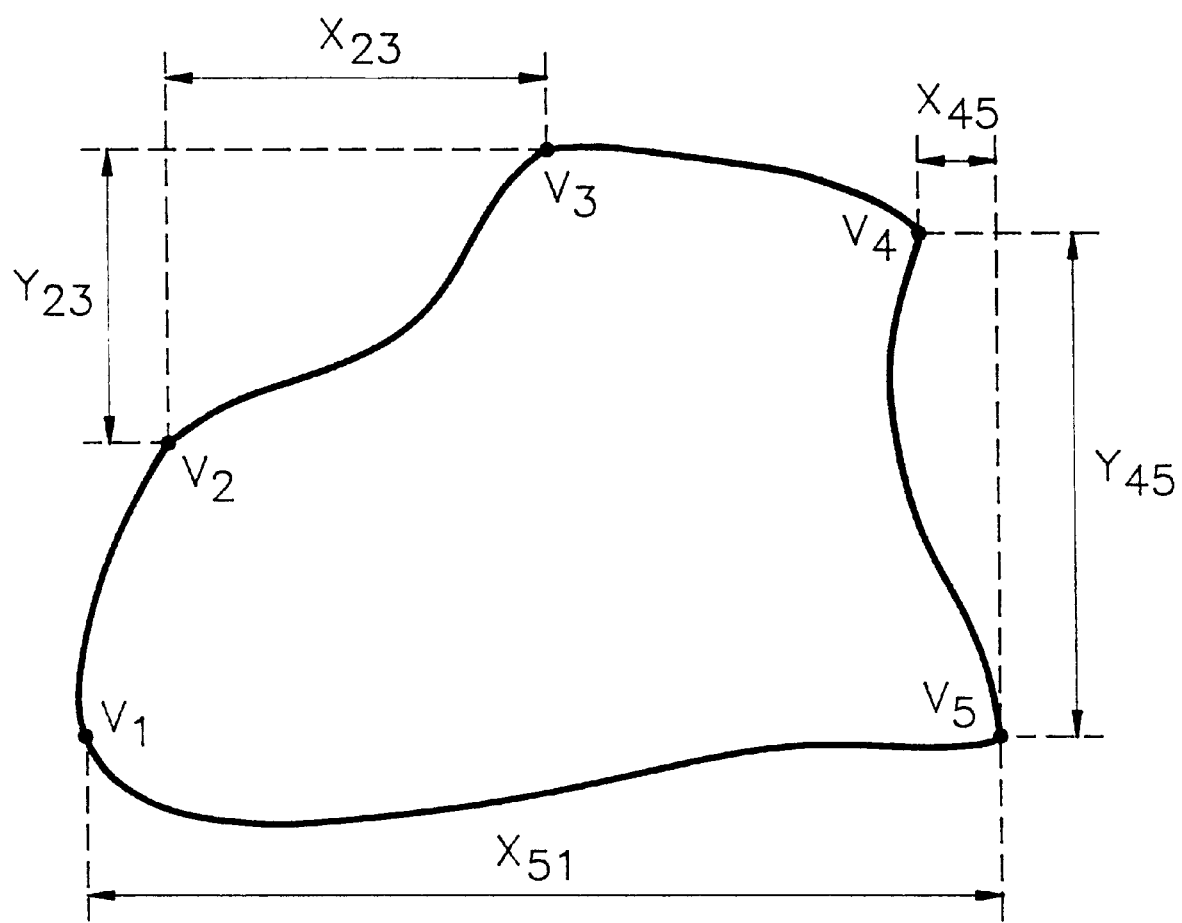
FIG. 4 provides an explanatory contour for illustrating a function of the range determination block in FIG. 3.

In the meantime, the initial vertex selection block 115 selects an initial and an ending vertices by using a conventional vertex reordering technique. In the conventional vertex reordering technique, horizontal and vertical components, $R(x)$ and $R(y)$, and their magnitudes, x_mag and y_mag of a displacement between each pair of adjacent vertices are calculated; and two vertices corresponding to a largest magnitude among all the x_mag's and y_mag's are selected as the initial and the ending vertices, i.e., a first and an Nth vertices of the contour, N being the total number of the vertices. The N, e.g., 5, vertices are then sequentially indexed along the contour starting from the first vertex toward the Nth vertex as shown FIG. 4. In FIG. 4, x_mag $X_{51}$ corresponding to a pair of the vertices $V_1$ and $V_5$ is largest among 5 pairs of x_mag's and y_mag's obtained from the vertices $V_1$ to $V_5$. Information on the vertices is provided to a range determination block 120 and the vertex coding block 160.

Referring back to FIG. 3, the range determination block 120 determines an x_dynamic_range and a y_dynamic_range based on the information on the vertices fed from the initial vertex selection block 115. The x_dynamic_range and the y_dynamic_range of the contour, critical to determine the total bit number necessary to encode the reordered vertices, represent the respective maximum values of x_mag's and y_mag's of the displacements $R_i$'s, respectively, wherein $R_i=P_{i+1}-P_i$ for i=1,2,...,N-1, $P_i$ being a position vector corresponding to a vertex $V_i$. In FIG. 4, x_mag $X_{23}$ of displacement $R_2=P_3-P_2$ and y_mag $Y_{45}$ of displacement $R_4=P_5-P_4$ are determined as the x_dynamic_range and the y_dynamic_range of the contour, respectively. It is preferable to take no account of the displacement between the first and the Nth vertices. An x_bit_number and a y_bit_number are calculated, at the range determination block 120, and provided to the vertex bit-number calculation block 135 and the vertex coding block 160, wherein the x_bit_number and the y_bit_number are the numbers of bits required to encode the x_dynamic_range and the y_dynamic_range, respectively.

The vertex coding block 160 sequentially encodes the vertices fed from the initial vertex selection block 115 based on the x_bit_number and the y_bit_number fed from the range determination block 120. The total number of vertices, i.e., N, the x_bit_number, the y_bit_number and the absolute position of the first vertex $V_1$ are encoded, while each of the remaining vertices, i.e., $V_{i+1}$ for i=1 to (N-1), is encoded based on the displacement $R_i=P_{i+1}-P_i$ from its previous vertex $V_i$. The vertex encoded data is provided to the selection block 180.

Figure 5:
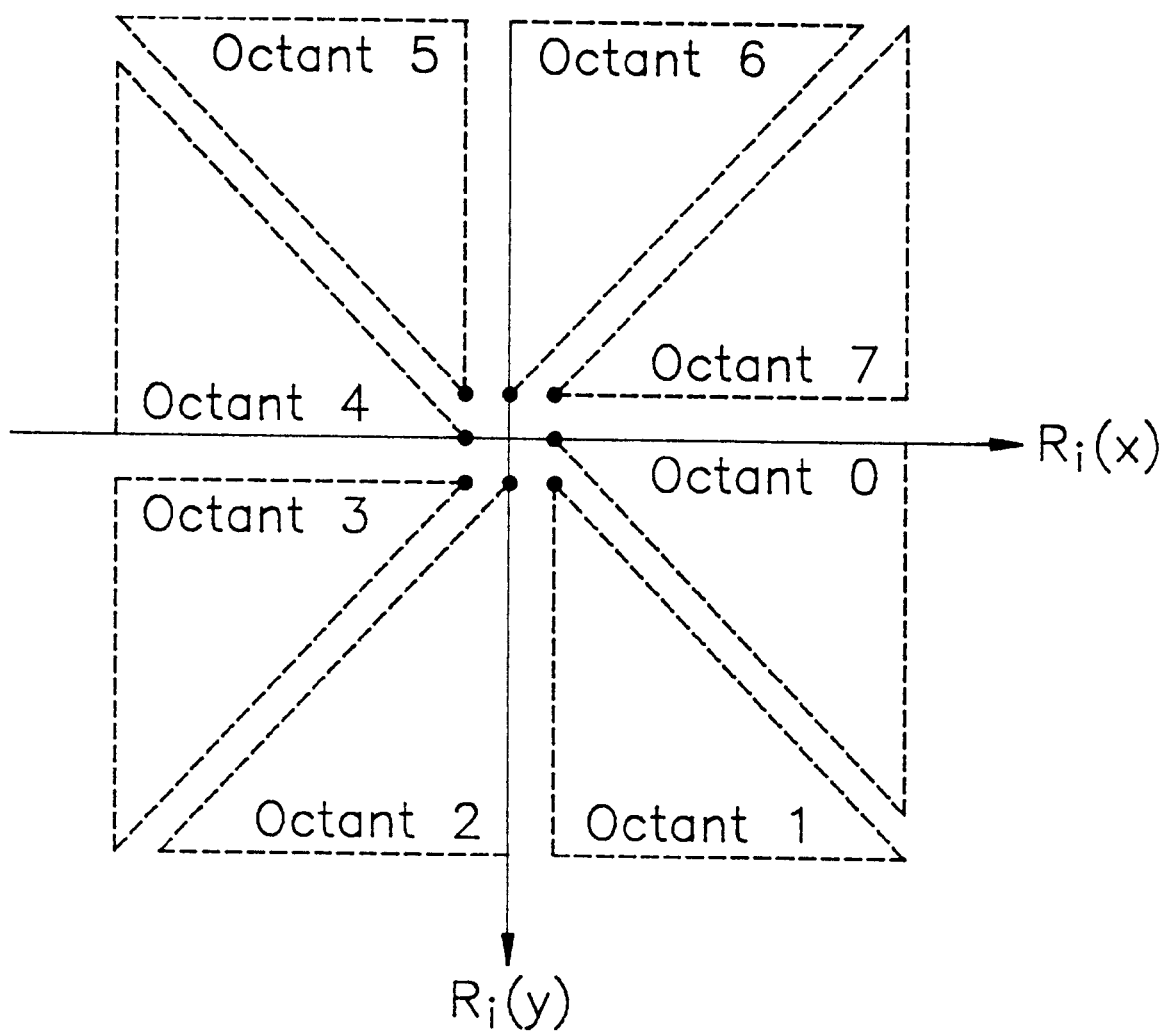
FIG. 5 describes an explanatory diagram for illustrating the relative address octant areas.

Specifically, as shown in FIG. 5, an octant to which a vertex $V_{i+1}$ belongs is determined among octant 0 to octant 7 based on an x component $R_i(x)$ and a y component $R_i(y)$ of the displacement $R_i$, wherein the eight nearest neighbors to the origin (all marked by the closed circles in FIG. 5) represent the starting points of the eight octants.

After determining octants for the vertices $V_{i+1}$'s, the indices of the octants are coded by using the conventional differential chain coding technique; and the magnitudes of the components $R_i(x)$ and $R_i(y)$, i.e., x_mag and y_mag, representing the relative position vector of the vertex $V_{i+1}$ with respect to its preceding vertex $V_i$ are encoded using the bits determined based on the x_dynamic_range and the y_dynamic_range, respectively.

As another instance of the octant-based vertex coding technique, the octant indices and $R_i$'s are encoded alternatively through the use of the so-called syntax-adaptive arithmetic coding (SAAC). In the SAAC, the number of possible symbols is dependent on the dynamic range maximum, i.e., max(x_dynamic_range, y_dynamic_range). (For further details of the octant-based vertex coding technique, see K. O'Connell et al., supra.)

Referring back to FIG. 3, the vertex bit-number calculation block 135 calculates a vertex bit-number based on the vertex number N fed from the vertex counter 130 and the x_bit_number and the y_bit_number fed from the range determination block 120, wherein the vertex bit-number represents the number of bits required to encode all the vertices. The vertex bit-number is preferably determined as the vertex number N multiplied by the sum of the x_bit_ number and the y_bit_number. The vertex bit-number is provided to a comparison block 150.

In the meantime, the contour pixel counter 140 counts the number of contour pixels representing the contour based on the input contour image data; and calculates a contour pixel bit-number based on the contour pixel number, wherein the contour pixel bit-number is equal to the contour pixel number multiplied by a predetermined weight, 1.5 being preferably used as the weight if considering a variable length coding technique and a quantization. The contour pixel bit-number is provided to the comparison block 150.

The comparison block 150 determines whether information on the contour will be vertex-coded or chain-coded based on the vertex bit-number and the contour pixel bit-number, to provide a determination signal to the selection block 180. If the contour pixel bit-number is greater than the vertex bit-number, a first determination signal to select the vertex coded data is generated and, if otherwise, a second determination signal to select the chain coded data is generated.

The selection block 180 selects coded data among the vertex coded data fed from the vertex coding block 160 and the chain coded data fed from the chain coding block 170 in accordance with the determination signal to provide the selected coded data on the input contour image data to the transmitter(not drawn).

While the present invention has been described with respect to the particular embodiments, it will be apparent to those skilled in the art that various changes and modifications may be made without departing from the scope and the spirit of the invention as defined in the following claims.

What is claimed is:

1. A method for encoding a video signal of a contour of an object based on an iterated refinement technique, wherein a plurality of vertices are determined on the contour having contour pixels therein and each contour segment defined by two adjacent vertices on the contour is approximated by a line segment joining said two adjacent vertices, the method comprising the steps of:

(a) calculating a contour pixel bit-number, wherein the contour pixel bit-number represents the number of bits necessary to encode all the contour pixels;
   (b) estimating a vertex bit-number, wherein the vertex bit-number represents the number of bits necessary to encode all the vertices on the contour;
   (c) comparing the contour pixel bit-number with the vertex bit-number to generate a determination signal representing the smaller of the two bit-numbers; and
   (d) encoding contour information based on the determination signal to generate coded data, wherein the contour information represents either the vertices or the contour pixels.

2. The method according to claim 1, wherein said calculating step (a) includes the steps of:

(a1) counting the number of the contour pixels to generate a contour pixel number; and
   (a2) multiplying the contour pixel number with a predetermined weight ranging between 1 and 10 to generate the contour pixel bit-number.

3. The method according to claim 1, wherein said estimating step (b) includes the steps of:

(b1) counting the number of the vertices to generate a vertex number N, N being a positive integer;
   (b2) determining an x_bit_number and a y_bit_number for all the vertices, wherein the x_bit_number and the y_bit_number represent the numbers of bits required to encode horizontal and vertical components on displacements of all pairs of adjacent vertices, respectively; and
   (b3) multiplying the vertex number with the sum of the x_bit_number and the y_bit_number to generate the vertex bit-number.

4. The method according to claim 3, wherein said determining step (b2) contains the steps of:

(b21) computing an x_mag and a y_mag of each pair of adjacent vertices for all the vertices, wherein the x_mag and the y_mag represent magnitudes of horizontal and vertical components of a displacement between said each pair of adjacent vertices, respectively;
   (b22) choosing a first and an Nth vertices among the N vertices, wherein two adjacent vertices corresponding to a largest magnitude among x_mag's and y_mag's for the N vertices are selected as the first and the Nth vertices, respectively;
   (b23) determining an x_dynamic_range and a y_dynamic_range for the contour, wherein the x_dynamic_range and the y_dynamic_range represent the respective maximum values of x_mag's and y_mag's of displacements $R_i$'s, respectively, $R_i = P_{i+1} - P_i$ for $i=1,2,\ldots,N-1$, $P_i$ being a position vector for an ith vertex $V_i$; and
   (b24) converting the x_dynamic_range and the y_dynamic_range into the x_bit_number and the y_bit_number, respectively.

5. The method according to claim 4, wherein said coding step (d) includes the steps of:

(d1) vertex-coding vertex information to generate vertex coded data, the vertex information representing the displacements between all pairs of adjacent vertices;
   (d2) chain-coding contour pixel information to generate chain coded data, the contour pixel information representing the displacements between all pairs of adjacent contour pixels; and
   (d3) selecting either the vertex coded data or the chain coded data based on the determination signal, wherein, if the vertex bit-number is smaller than the contour pixel bit-number, the vertex coded data is selected and, if otherwise, the chain coded data is selected.

6. The method according to claim 5, wherein said vertex coded data contains the vertex number N; the x_bit_number; the y_bit_number; the absolute position of the first vertex; and the horizontal and vertical components of the displacement for each pair of adjacent vertices to be coded based on the x_bit_number and the y_bit_number.

7. The method according to claim 5, wherein said vertex-coding step (d1) is carried out by using a locally-adaptive octant-based vertex coding technique.

8. An apparatus for encoding a video signal of a contour of an object based on an iterated refinement technique, wherein a plurality of vertices are determined on the contour having contour pixels therein and each contour segment defined by two adjacent vertices is approximated by a line segment joining said two adjacent vertices, the apparatus comprising:

means for calculating a contour pixel bit-number, wherein the contour pixel bit-number represents the number of bits necessary to encode all the contour pixels;
   means for estimating a vertex bit-number, wherein the vertex bit-number represents the number of bits necessary to encode all the vertices on the contour;

comparator for comparing the contour pixel bit-number with the vertex bit-number to generate a determination signal representing the smaller of the two bit-numbers; and means for encoding contour information based on the determination signal to generate coded data, wherein the contour information represents either the vertices or the contour pixels.

9. The apparatus according to claim 8, wherein said calculating means includes:

contour pixel counter for counting the number of the contour pixels to generate a contour pixel number; and multiplier for multiplying the contour pixel number with a predetermined weight ranging between 1 and 10 to generate the contour pixel bit-number.

10. The apparatus according to claim 8, wherein said estimating means includes:

vertex counter for counting the number of the vertices to generate a vertex number N, N being a positive integer;

means for determining an x_bit_number and a y_bit_number for all the vertices, wherein the x_bit_number and the y_bit_number represent the numbers of bits required to encode horizontal and vertical components of displacements of all pairs of adjacent vertices, respectively; and multiplier for multiplying the vertex number with the sum of the x_bit_number and the y_bit_number to generate the vertex bit-number.

11. The apparatus according to claim 10, wherein said determining means contains:

means for computing an x_mag and a y_mag of each pair of adjacent vertices for all the vertices, wherein the x_mag and the y_mag represent magnitudes of horizontal and vertical components of a displacement between said each pair of adjacent vertices, respectively;

means for choosing a first and an Nth vertices among the N vertices, wherein two vertices corresponding to a largest magnitude among all the x_mag's and y_mag's for the N vertices are selected as the first and the Nth vertices, respectively;

means for determining an x_dynamic_range and a y_dynamic_range for the contour, wherein the x_dynamic_range and the y_dynamic_range represent the respective maximum values of x_mag's and y_mag's of displacements $R_i$'s, respectively, $R_i = P_{i+1} - P_i$ for i=1,2,...,N-1, $P_i$ being a position vector for an ith vertex $V_i$; and means for converting the x_dynamic_range and the y_dynamic_range into the x_bit_number and the y_bit_number, respectively.

12. The apparatus according to claim 11, wherein said encoder includes:

vertex-coding means for encoding vertex information to generate vertex coded data, the vertex information representing the displacements between all pairs of adjacent vertices;

chain-coding means for encoding contour pixel information to generate chain coded data, the contour pixel information representing the displacements between all pairs of adjacent contour pixels; and means for selecting either the vertex coded data or the chain coded data based on the determination signal, wherein, if the vertex bit-number is smaller than the contour pixel bit-number, the vertex coded data is selected and, if otherwise, the chain coded data is selected.

13. The apparatus according to claim 12, wherein said vertex coded data contains the vertex number N, the x_bit_number, the y_bit_number, the absolute position of the first vertex and the horizontal and vertical components of the displacement for each pair of adjacent vertices to be coded based on the x_bit_number and the y_bit_number.

14. The apparatus according to claim 12, wherein said vertex-coding means is carried out by using a locally-adaptive octant-based vertex coding technique.

* * * * *